Aug. 5, 1930.                R. W. ANDREWS                1,772,023
                             FLUID SEPARATOR
                           Filed Oct. 20, 1925

INVENTOR.
Roger W. Andrews
BY E. J. Andrews
ATTORNEY.

Patented Aug. 5, 1930

1,772,023

UNITED STATES PATENT OFFICE

ROGER W. ANDREWS, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed October 20, 1925. Serial No. 63,612.

This invention relates to improvements in fluid separators, and has for its object the production of means for more perfectly separating the impurities, particularly liquids, from various gases. The invention is directed particularly towards eliminating all of the liquid from the gas such as oil vapor or steam by maintaining the speed of the gas through the separator at a sufficiently low speed. A further object is to properly distribute the gas so that it will pass through all portions of the separator at substantially the same speed, and thus the capacity as well as the effectiveness of the separator will be increased.

Figure 2:
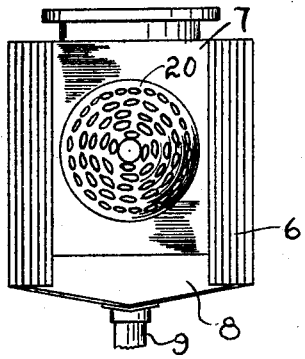
Figure 1:
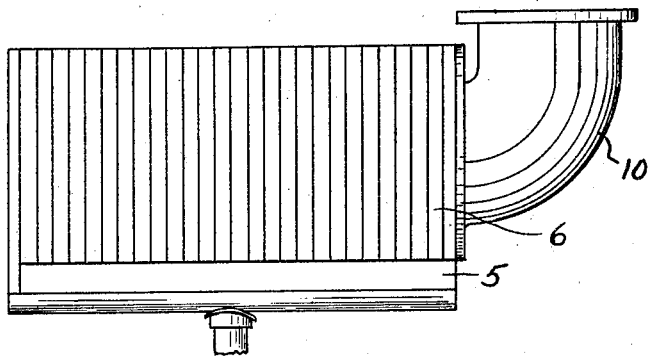
Figure 3:
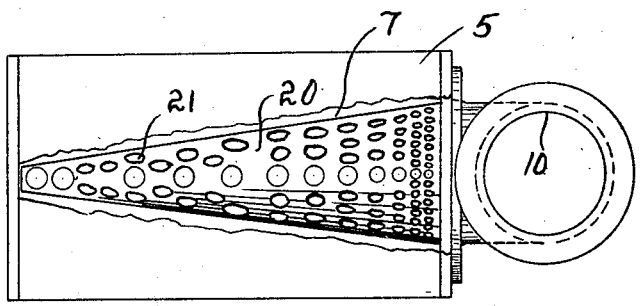
Figure 4:
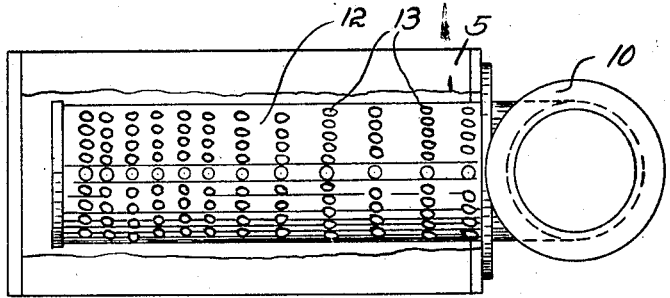

Of the drawings Fig. 1 is an elevation of a separator embodying features of my invention; Fig. 2 is an end view of the separator with the end plate removed; Fig. 3 is a plan view of the separator with a portion of the casing broken away; Fig. 4 is a view similar to Fig. 3 but with a modified form of inner casing; and Fig. 5 is an end view of the separator of Fig. 4, with the end plate removed.

Although I have herein illustrated and described a steam separator or purifier as embodying my invention, yet it is to be understood that the invention is applicable to the separation of any fluids, such as the separation of liquids and other impurities from any vapors or gases, and the term separator or purifier as used herein is intended to refer to any suitable form of fluid separator or vapor purifier wherein impurities such as liquid or solid particles are separated from the gas or vapor which it is desired to purify.

As is well understood, it is common, in order to separate impurities such as moisture and solid impurities from the steam, to pass the steam, on its way from the interior of the boiler to the steam mains of the system, through a purifier or separator. The purifier ordinarily comprises some form of baffles, around or through which the steam must pass, and so arranged that, while the steam itself will pass through, yet the impurities such as moisture will be retained and passed back into the boiler or drained outside of the boiler, as conditions may make desirable.

Figure 5:
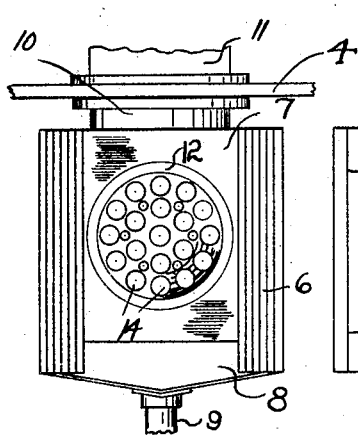

The apparatus which I prefer to use in carrying out my invention is illustrated in Figs. 4 and 5, and comprises a casing 5 in the sides of which are openings in which are mounted systems of baffles 6. The openings in the sides of the casing constitute the gas or steam inlets to the casing. The casing when in use is mounted within a boiler 4 and the steam passes through the baffles 6 into the interior chamber 7 of the purifier and then, ordinarily, the steam passes through an outlet 10 out of the boiler 4 into the steam main 11 of the system. As the steam passes through the baffles the moisture therein is stopped in its flow by the baffles and it runs downwardly into the passageway 8, and thence through a pipe 9 into the boiler water, or to any point to which it is desired to discharge this liquid.

I have found, however, that if the speed of the steam through the baffles is too great, the separation of the moisture from the steam will be imperfect, as there is more or less of a tendency for the moisture, owing to spattering or otherwise, to be carried along with the steam. While the exact speed with which the steam passes through the baffles is not very material, yet I have found that the speed of some portion of the steam through ordinary purifiers or separators is too great. With the ordinary types of purifiers the passage of the steam through the purifier baffles meets with less resistance as the outlet 10 is approached, hence, the steam entering near the outlet end of the purifier passes through the baffles at a much higher speed than that of the steam entering at more remote points. As a consequence the steam entering near the outlet passes through the baffles frequently at too high a speed, and, at the same time, the steam entering at remote points passes through the baffles at unnecessarily low speeds.

Therefore, in order to properly distribute the steam so as to cause it to pass through the baffles at all portions of the purifier at substantially uniform speeds which are sufficiently low to produce a perfect separation, I provide means for obstructing the flow more and more as the outlet is approached, and I increase the resistance to the flow as the outlet is approached at such rate as to reduce the speed near the outlet without reducing the speed at more remote points materially below the speed near the outlet. Any suitable means may be used for producing such a resistance to the flow of the steam. In this instance I prefer to provide means within the passageway 7 so arranged that the resistance to the flow from this passageway to the outlet increases at a suitable rate as the outlet is approached.

In this instance I have shown a cylindrical central passageway within a conduit 12, one end of which is open and registers with the outlet 10, and which has numerous openings 13 in its walls so formed as to provide a total cross section of the openings adjacent the outlet much less than at more remote points. In this way the flow of steam through the baffles may be controlled so that the speed will be substantially uniform throughout all portions of the baffles.

The amount of steam flowing through any given section of the baffles will depend upon the amount flowing through the walls of the conduit 12 directly behind the given section of baffles. Thus if it is desired that, for each linear inch of baffle surface there should be equal volume, and hence equal speed of gas flowing, then the conduit must be formed so that for each linear inch of its length equal volumes of steam will flow through its walls.

The rate of flow of a gas through any opening depends upon the drop in pressure through the opening, and as the back pressure within the conduit will decrease as the outlet is approached, the pressure drop through the openings 13 will increase as the outlet is approached. Hence to produce uniform flow through all portions of the conduit wall, and thus through the baffles, the aggregate opening areas per unit length of the conduit must increase as the distance from the outlet increases. The openings therefore must be larger or more numerous or both.

In practice I increase the area of the openings at a greater rate than the increase in distance from the outlet end of the conduit. To accomplish this I increase the number of openings as the outer end of the conduit is approached, and provide numerous openings 14 in the outer end of the conduit.

It is obvious that the shape or size or positions of these openings might be modified as desired. In Fig. 3 I have shown the conduit 20 conical and the remote openings 21 materially larger than some of the others.

It is also obvious that other variations in the means for retarding the flow of the steam and for varying the relative retardation thereof might be made.

I claim as my invention:

1. A vapor purifier comprising an elongated casing having an inner passageway, means mounted in the walls of said casing for purifying the vapor, a vapor outlet connected with one end of said inner passageway, an elongated cylindrical conduit mounted in said passageway with one end registering with said outlet, the walls of said conduit being spaced away from the walls of said casing and said purifying means, said conduit having openings through its walls, the aggregate capacity of said openings decreasing as said outlet is approached.

2. A fluid purifier comprising an elongated casing, baffles mounted in the walls of said casing for purifying the fluid, said casing having an inner passageway and having a fluid outlet at one end of the casing, a conduit having openings therethrough and mounted in said passageway, said openings being scattered vertically over the side walls of said conduit, one end of the conduit being connected with said outlet, the aggregate capacity per unit of length of said openings being less near the outlet than near the other end of said conduit, and the aggregate capacity of said openings changing at a rate unlike the rate of increase in distance from the outlet.

3. A fluid purifier comprising an elongated casing, baffles mounted in the walls of said casing for purifying the fluid, said casing having an inner passageway and having a fluid outlet at one end of said casing, and means mounted in said passageway for retarding the flow of fluid from said baffles to said outlet, said means comprising a conduit having openings therethrough, said openings being positioned vertically and longitudinally over substantially the entire side walls of the inner conduit, one end of the conduit being connected with said outlet, the aggregate capacity of said openings being less near the outlet than near the other end of said conduit.

4. A gas drier comprising an elongated cylindrical conduit having a cylindrical bore and having a gas outlet at one end registering with and comparable in area with the said bore, and having a longitudinal row of openings through its wall on one side thereof, whereby the gas passes through the wall and into the said bore, the openings in the row being farther apart near the outlet end than near the other end of the conduit, whereby the gas is more evenly distributed through the openings.

5. A gas purifier comprising a casing having an inner passageway, said casing having gas inlets into said passageway, said inlets having means for purifying the gas as it passes through, said casing having a gas outlet connected with said inner passageway, and means for retarding the flow of gas through said purifying means, said retarding means comprising a second casing having openings through its walls, one end of said second casing being open and registering with said outlet, the other end of said second casing having an opening therethrough.

6. A fluid separator comprising an elongated casing having an inner passageway and having means in its walls for purifying the fluid, a fluid outlet connected with one end of said inner passageway, and a conduit mounted in said passageway with one end thereof registering with said outlet, said conduit having numerous openings through its walls, said openings being positioned over substantially the entire surface of the side walls of said conduit, the aggregate cross section of said openings per unit length of the conduit varying materially with the distance from said outlet.

7. A vapor purifier comprising an elongated casing having an inner passageway, means mounted in the walls of said casing for purifying the vapor, a vapor outlet connected with one end of said inner passageway, an elongated conduit mounted in said passageway with one end registering with said outlet, the walls of said conduit being spaced away from the walls of said casing and said purifying means, said conduit having openings through substantially all portions of its walls, the aggregate capacity of said openings per unit of length of the conduit decreasing as said outlet is approached.

In testimony whereof, I hereunto set my hand.

ROGER W. ANDREWS.